United States Patent [19]
Leon

[11] Patent Number: 5,430,368
[45] Date of Patent: Jul. 4, 1995

[54] METHOD FOR REMOTELY APPROXIMATING THE STEM THRUST OF MOTOR OPERATED VALVES

[75] Inventor: Robert L. Leon, Maple Glen, Pa.

[73] Assignee: Liberty Technologies, Inc., Conshohocken, Pa.

[21] Appl. No.: 161,833

[22] Filed: Dec. 3, 1993

Related U.S. Application Data

[63] Continuation-in-part of Ser. No. 71,421, Jun. 3, 1993.

[51] Int. Cl.$^6$ .................................... G01M 19/00
[52] U.S. Cl. ................................ 324/73.1; 73/168
[58] Field of Search .............. 324/73.1; 73/168; 251/129.01, 129.04, 129.12; 137/487.5, 551

[56] References Cited

U.S. PATENT DOCUMENTS

| | | | |
|---|---|---|---|
| 4,542,649 | 9/1985 | Charbonneau et al. | 73/168 |
| 4,735,101 | 4/1988 | Charbonneau | 73/168 |
| 4,805,451 | 2/1989 | Leon | 73/168 |
| 4,831,873 | 5/1989 | Charbonneau et al. | 73/168 |
| 4,869,102 | 9/1989 | Hale et al. | 73/168 |
| 4,888,996 | 12/1989 | Rak et al. | 73/862.19 |
| 4,891,975 | 1/1990 | Charbonneau et al. | 73/168 |
| 4,896,101 | 1/1990 | Cobb | 324/73.1 |
| 4,987,358 | 1/1991 | Branam | 318/603 |
| 5,000,040 | 3/1991 | Charbonneau et al. | 73/168 |
| 5,029,597 | 4/1991 | Leon | 137/1 |
| 5,239,874 | 8/1993 | Hale | 73/168 |

FOREIGN PATENT DOCUMENTS

WO8704244 7/1987 WIPO.

Primary Examiner—Kenneth A. Wieder
Assistant Examiner—Mark Wardas
Attorney, Agent, or Firm—Panitch Schwarze Jacobs & Nadel

[57] ABSTRACT

A method for approximating a stem thrust difference during the operation of a motor operated valve combination includes the steps of sensing the stem thrust of the motor operated valve combination as a function of time during valve closing at a first time. From the sensed information, the rate of thrust build-up is determined after the onset of wedging during valve closing at the first time. The real electrical power of the motor is then sensed as a function of time during valve closing at a second time which is subsequent to the first time. The rate of real motor power build-up after the onset of wedging during valve closing at the second time is determined from the sensed information. The ratio of thrust change to power change is approximated by dividing the rate of thrust build-up after the onset of wedging at the first time by the rate of real motor power build-up after the onset of wedging at the second time. The power difference is noted between two selected locations on the trace of real electrical motor power as a function of time at the second time, the two selected locations being those for which it is desired to approximate the thrust difference. The two selected locations are not limited as to whether either or both is before or after the onset of wedging. Then the thrust difference at the second time between the two selected locations is approximated by multiplying the noted power difference between them by the approximated ratio of thrust change to power change at the second time.

2 Claims, 3 Drawing Sheets

METHOD FOR REMOTELY APPROXIMATING THE STEM THRUST OF MOTOR OPERATED VALVES

This is a continuation in part of co-pending U.S. patent application Ser. No. 08/071,421, filed Jun. 3, 1993, and entitled "A Method For Remotely Determining Operability Of Motor Operated Valves".

FIELD OF THE INVENTION

The present invention relates generally to motor operated valve combinations and, more particularly, to a method for approximating from a remote electrical power measurement and the results of a previous thrust measurement, stem thrust differences during the operation of the motor operated valve combination.

BACKGROUND OF THE INVENTION

Motor operated valve combinations or valves are commonly used in nuclear and other power plants to perform routine opening and closing of water and steam lines and, more importantly, for those valves designated as safety related, to perform such openings or closings to assure prompt, safe shutdown of the plant under accident or other emergency or abnormal operating conditions. For those valves of this class whose safety function is to close a water, steam or other line, it is important that the valve achieve full or complete closure when called upon to do so. Most motor operated valves in use today are controlled by a torque switch which shuts off or stops the operation of the operator motor when a predetermined valve actuator torque limit is reached and a spring pack or other component moves in response to actuator torque to trip or actuate the torque switch. Since the torque switch displacement is approximately proportional to the actuator torque above some preload torque, and since the actuator torque is approximately proportional to the stem thrust, the torque switch displacement set point can be and generally is used to turn off the motor at approximately a value sufficient to fully close the valve and provide some additional margin to both help insure against leakage and account for possible degradations and non repeatabilities that could reduce that margin.

A certain amount of stem thrust is required for a motor operated valve (MOV) to close against differential pressure. The required thrust can be calculated as the sum of the packing friction force, the stem rejection force, and the differential pressure force. The packing friction force is the force required to push the valve stem through the packing which has been compressed against the stem to prevent leakage. The stem rejection force is the force of the internal pressure trying to spit out the valve stem. It is equal to the internal line pressure times the cross sectional area of the stem. The differential pressure force is the friction force opposing the inward movement of the valve disc as it is pushed in by the valve stem to close off the opening of the valve. It is equal to the differential pressure across the valve times the effective area of the valve disc against the downstream seat, this coefficient of friction is often referred to as the valve factor. The valve factor is the least predictable, and possibly least constant factor for required thrust.

A control switch, typically the torque switch, is adjusted to trip and thereby turn off the operator motor at a stem thrust level which is generally higher than the computed required closure thrust so as to provide a comfortable margin to account for unpredictable or changeable factors such as the valve factor in the required thrust, and such as stem lubrication degradation which can reduce the achieved thrust for the given amount of achieved torque. Typically a thrust verification test is run at the valve to determine the actual thrust applied to the valve stem at control switch trip (CST), usually torque switch trip, making sure the actual thrust exceeds the computed required closure thrust by a comfortable margin. The at-the-valve test is repeated periodically to insure that degradations such as lubrication degradation have not significantly reduced the level of thrust being developed at CST. Lubrication degradation increases the friction between the threads of the valve stem and the threads of the stem nut that drives the valve stem. This increased friction is what causes lower thrust for the given amount of torque.

Co-pending Parent U.S. patent application Ser. No. 08/071,421, filed Jun. 3, 1993, describes a method for remotely quantifying lubrication degradation so that during times when plant maintenance personnel cannot be at the valve during plant operation (common in nuclear power plants), proper lubrication may be remotely verified, and if improper lubrication should be detected, operations may be halted so that the necessary relubrication can take place. The parent patent application also describes a remote means for approximating thrust differences above or after the onset of wedging including the reverification of thrust margins, defined there as the difference between the thrust at the onset of wedging and thrust at CST. Valuable as such knowledge is, the methodology described in the parent application does not address how to remotely approximate thrust differences below as well as above the onset of wedging, nor how to approximate absolute values of thrust both below and above the onset of wedging. The methods to accomplish these results are the subject of the present invention.

The parent patent application recognizes and makes use of the fact that the time rate of thrust buildup after the onset of wedging remains constant independent of lubrication degradation. The present invention makes use of that fact as well as the fact that as the motor operated valve actuates, the ratio of change in thrust to change in power remains constant before and after the onset of wedging for a given lubrication condition.

SUMMARY OF THE INVENTION

Briefly stated, the present invention comprises a method for approximately determining absolute thrust values, and thrust differences, anywhere the valve actuator motor of a motor operated valve combination is turning so as to apply thrust. The motor operated valve combination includes a valve having a valve stem, a valve disc, a valve seat, and a motor operator having a motor drive means interconnecting the motor to the valve stem for movement of the valve disc toward and into engagement with the valve seat to close the valve, and a control switch for deactivating the motor. The method comprises the steps of first sensing the thrust as a function of time during an initial valve closure, including the thrust above the onset of wedging. Next, sensing remotely the real motor power as a function of time during a subsequent valve closure, including the region corresponding to zero thrust and the region above the onset of wedging. From the sensed information, the initial rate of thrust buildup above the onset of wedging is determined and is assumed to remain constant independent of lubrication condition, and the rate of power buildup above the onset of wedging is determined for the subsequent lubrication condition. The ratio of the initial thrust rate to the subsequent power rate, both above the onset of wedging, is the same as the ratio of a thrust difference to a power difference for the subsequent condition since the thrust rate remains constant independent of lubrication condition. Since the ratio of thrust difference to power difference remains constant for the given lubrication condition above and below the onset of wedging, the relationship can be used regardless of stem thrust even down to zero thrust. Thus absolute thrust in the subsequent condition can be approximated remotely by noting in the remotely determined power trace the power difference between the zero thrust point and the desired thrust point, and multiplying this difference by the ratio of thrust difference to power difference, determined above as the initial thrust rate to subsequent power rate.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred, it being understood, however, that the invention is not limited to the precise arrangements and instrumentalities shown. In the drawings.

DETAILED DESCRIPTION OF PREFERRED EMBODIMENT

Figure 1:
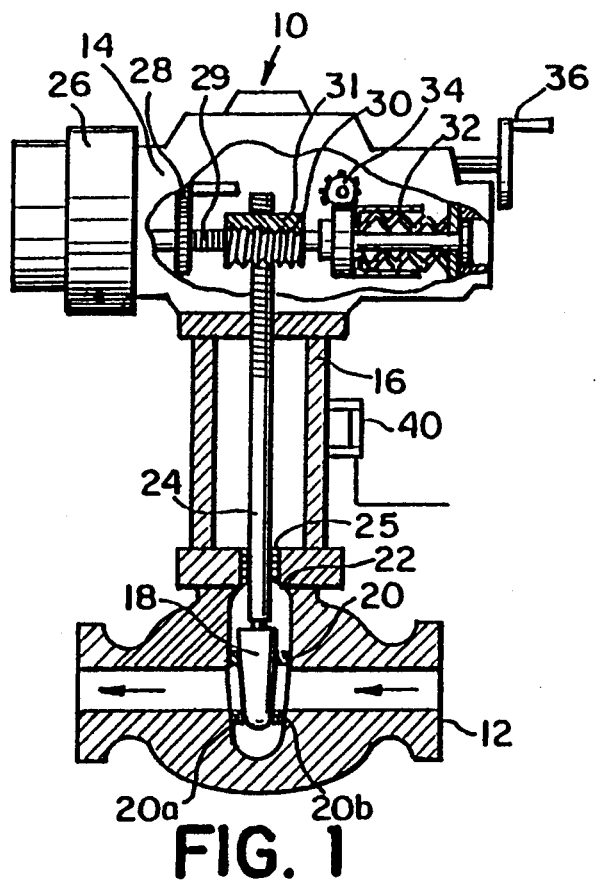
FIG. 1 is an elevation view of a motor operated gate valve shown partially in section and partially broken away, with a preferred embodiment of a yoke mounted thrust sensor for measuring the valve stem thrust as the motor operated valve is stroked in accordance with the present invention.

Referring now in greater detail to the drawings, in which like numerals indicate like elements throughout, there is shown in FIG. 1, an elevation view, partially broken away and partially in section, of a motor operated gate valve combination or valve 10. The motor operated gate valve 10 is a type which is generally well known in the art and is commercially available from a variety of sources. The motor operated gate valve 10 includes a valve member 12 and a valve operator 14 which are connected together by a valve yoke 16. The valve member or valve 12 includes a movable valve member or disc 18, a fixed valve seat 20 including a downstream seat ring 20a and an upstream seat ring 20b, and a fixed valve backseat 22. The valve disc 18 is movable between a "seated" position (not shown) in which it fully and firmly engages the entire valve seat 20 thereby fully closing the valve 12 and a "backseated" position (not shown) in which it engages the valve backseat 22 thereby fully opening the valve 12. As shown in FIG. 1, the valve disc 18 is in an intermediate position part way between the seated and backseated positions but closer to the seated position.

The valve disc 18 moves between the seated and backseated positions by the action of a valve stem 24, one end of which is secured to the valve disc 18. The valve stem 24 extends through suitable openings in the valve 12 and valve yoke 16 with the other end extending into the valve operator 14 as shown. Where the valve stem 24 extends through the valve 12, it is sealed against leakage by packing material 25.

The valve operator 14 contains a motor, in the present embodiment an electric motor, which in the present embodiment is shown as being a three phase A.C. motor. The output shaft of the motor 26 is connected through suitable reduction gears 28 to a splined worm shaft 29 whose splines force a worm 30 that surrounds it to rotate with it, and the worm in turn drives a worm gear 31. The worm gear 31 surrounds and is drivingly engaged with a drive sleeve and stem nut (not shown). The stem nut threadingly engages Acme type threading on the upper end of the valve stem 24. Since the stem nut is restrained from axial movement and the valve stem 24 is restrained from rotating, rotation of the stem nut results in axial movement of the valve stem 24. The direction of movement of the value stem 24 depends upon the direction of movement of the output shaft of the motor 26 and the corresponding direction of rotation of the stem nut. Of course, the axial movement of the valve stem 24 results in corresponding movement of the value disc 18 to open or close the valve 12. During the valve opening or closing operation, both thrust and torque exist between the valve stem 24 and the stem nut as a result of the Acme threads. As the valve disc 18 engages the valve seat 20 the compressive stem thrust increases, generating a reaction torque on the stem nut, drive sleeve and worm gear 31 which shows up as an axial force on the worm 30.

The worm 30 which can move axially along the splines of the worm shaft 29 is connected at its distal (rightmost) end to a spring pack 32 which allows the worm 30 to move proportional to the reaction torque, the proportionality factor determined by the stiffness of the spring pack 32. A separate small gear 34 is also connected to the spring pack 32. The gear 34, in turn, is connected to a torque switch (not shown) housed in switch compartment (also not shown), along with standard limit switches (not shown). The torque switch is used for deactivating or stopping the motor 26, referred to as torque switch trip, when the gear 34 turns a selectable preset amount as a result of the displacement of the spring pack 32. Since the generated stem torque is approximately proportional to the stem thrust, the torque switch is commonly adjusted to stop the motor 26 at the stem thrust desired for proper full valve closure.

As the valve operator 14 operates to close the valve 12, it develops both closing torque and compressive thrust on the valve stem 24 through the action of the Acme threads on the valve stem 24 and stem nut. The ratio of closing torque to compressive thrust, in foot-pounds per pound, is called the stem factor and it is a function of the stem 24 and stem nut thread geometry and the lubrication or lack thereof between them. For most stem geometries lubrication degradation, as a result of lubricant squeezing out in use or as a result of the lubricant hardening with age, can result in a doubling of the stem factor which would result in a corresponding halving of the developed stem thrust at torque switch trip. Thus lubrication degradation can significantly reduce the expected thrust delivered by the operator 14, and hence there is a very real need to periodically test a motor operated valve 10 to verify proper thrust at torque switch trip. Because thrust measurements can only be made at the valve 12, periodic verification testing has been historically done "at-the-valve". Such periodic nesting can create a period of uncertainty (i.e., between testings) for some very important valves, such as the valves in containment at nuclear power plants which are inaccessible and, therefore, not available for such at-the-valve testing for up to eighteen months between the refueling outages.

Additionally, it is usually difficult to test such valves with the actual required differential pressure across the valve, so a zero differential pressure test is typically conducted at-the-valve to assure that the valve operator 14 delivers sufficient closing thrust to meet, and exceed, the closing thrust calculated to fully seat the value disc 18 on the valve seat 20, fully closing the valve 12 in the expected or required differential pressure conditions.

For measuring the stem thrust, a yoke mounted force sensor 40 can be used as shown in FIG. 1 because it is difficult to measure forces from the stem directly and the same force that exists on the stem 24 also exists on the yoke 16. The sensor 40 and its calibration are described in detail in the inventor's U.S. Pat. No. 4,805,451 which is incorporated herein by reference. Complete details of the structure and operation of the force sensor 40 may be obtained by reference to the cited patent particularly FIGS. 4–6 and the corresponding portions of the specification, and need not be presented herein for a complete understanding of the present invention. Suffice it to say that the force sensor 40 effectively senses (through the valve yoke 16) forces experienced by the valve stem 24 and generates electrical signals which are proportionally related to the valve stem forces, and thus changes in those electrical signals are proportional to changes in valve stem thrust during closing of the valve 12. The analog electrical signals from the force sensor 40 are suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer for storage, and subsequent display as a stem thrust trace, or stem thrust as a function of time.

It will be appreciated by those skilled in the art that while in the presently preferred embodiment, the force sensor 40 is shown and described as being mounted on the valve yoke 16, the same force sensor 40 or another force sensor (not shown) mounted on the valve yoke 16 or elsewhere could serve the function of the present invention. Thus the present invention is not limited to a particular location for the force sensor 40, nor is it limited to a particular type of force sensor 40 for developing the stem thrust trace as a function of time.

Figure 2:
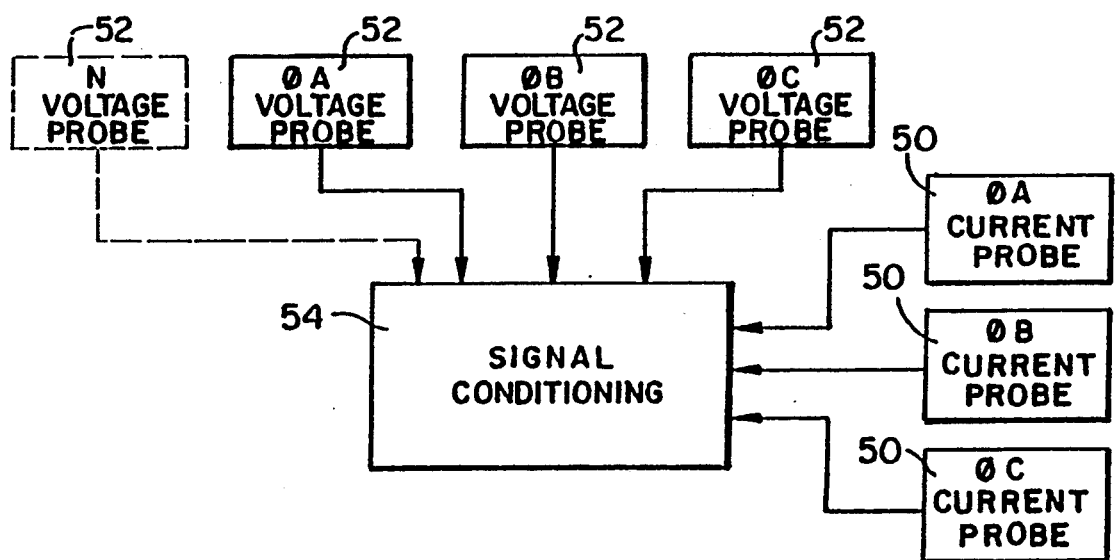
FIG. 2 is a schematic block diagram representation of a preferred embodiment of circuitry employed at a remotely located motor control center for the motor operated valve of FIG. 1 to remotely measure the motor power as the motor operated valve is stroked.

For measuring the motor power, three clamp-around Hall effect type current probes 50 of a type well known in the art, and three or four (depending on delta or wye three phase wiring configurations) clamp-on voltage probes 52, also of a type well known in the art, are utilized at the motor control center as shown functionally in FIG. 2. The current probes 50 and voltage probes 52 provide sufficient information to compute real (as opposed to apparent or reactive) motor power as a function of time. The analog electrical signals from the three current probes, and the three or four voltage probes are suitably amplified by signal conditioning circuits 52, the various amplifications being such as to take maximum advantage of a subsequent simultaneous-sampling multichannel analog-to-digital circuit (not shown) which converts each analog signal indicative of either instantaneous current or instantaneous voltage, to a series of digital samples equally spaced in time. The digital samples are provided to a computer for storage and subsequent calculation of the total real (active) motor power, which then can be displayed as a real motor power trace, or real motor power as a function of time.

It will also be appreciated by those skilled in the art that in the presently preferred embodiment, the current and voltage probes 50, 52 are sufficient for the accurate computing of real motor power, but that other probe arrangements (not shown) could also provide an accurate real motor power trace and could therefore serve the function of the present invention. Thus, the present invention is not limited to a particular type or arrangement of probes or sensors for developing the real motor power trace as a function of time.

In a subsequent section of the specification, the stem torque trace as a function of time is discussed. The stem torque trace discussion is only for clarity and completeness of understanding. The stem torque trace as a function of time is not a part of this invention, and therefore no preferred embodiment for its measurement is indicated. Nevertheless a method for developing a stem torque trace is presented as follows. The stem torque sensor could be a strain gage wheatstone bridge consisting of one, two or four active strain gages bonded to the valve stem 24 with the active gage direction oriented 45 degrees to both the axis and the cross-sectional plane of the stem 24. This process is well known in the art. The analog electrical output of the strain gage bridge is suitably amplified by a signal conditioning circuit (not shown), the amplification being such as to take maximum advantage of a subsequent analog-to-digital circuit (also not shown) which converts the analog signal to a series of digital samples equally spaced in time. The digital samples are provided to a computer for storage, and subsequent display as a stem torque trace, or stem torque as a function of time.

Figure 3A:
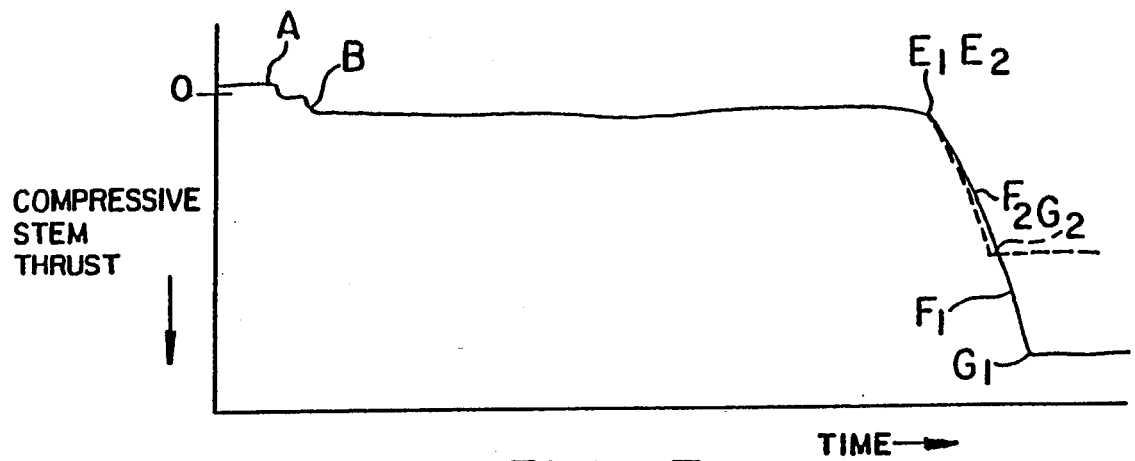
FIGS. 3a, 3b and 3c are composite graphic illustrations showing variation vs time in stem thrust, stem torque, and real motor power, respectively, during valve closure under zero differential pressure conditions, each showing the case of normal stem lubrication, and the case of significantly degraded stem lubrication, accentuating for comparison purposes both the running region before the onset of wedging and the seating region after the onset of wedging.

Typical stem thrust traces as a function of time during valve closure are shown in FIG. 3a for the closing of motor operated gate valve 10 under zero differential pressure. The solid trace (subscripts 1) of FIG. 3a is for the motor operated valve 10 with proper stem to stem nut lubrication. The dotted trace (subscripts 2) is for the same motor operated valve 10, but after significant stem to stem nut lubrication degradation. Referring to FIG. 3a, when the valve 12 first starts to close (point A), the initial stem tension due to packing force remaining from when the valve previously opened is converted into stem compression (point B) as the valve stem 24 moves into the valve 12 through the packing 25. Since there is no differential pressure forcing the valve disc 18 against the downstream seat 20a, there is no change in stem thrust until the motor operator 14 begins to wedge the valve disc 18 between the upstream and downstream seats 20a, 20b (point E). Since the motion of the valve disc 18 is substantially halted at this point, the additional valve stem thrust, termed "disc wedging force", builds up very rapidly to the toque switch trip (point F), and beyond to the maximum stem thrust (point G) because of contactor dropout time and rotary inertia. For conservative reasons, only point F, the thrust at torque switch trip, is assumed to be assured.

Figure 3B:
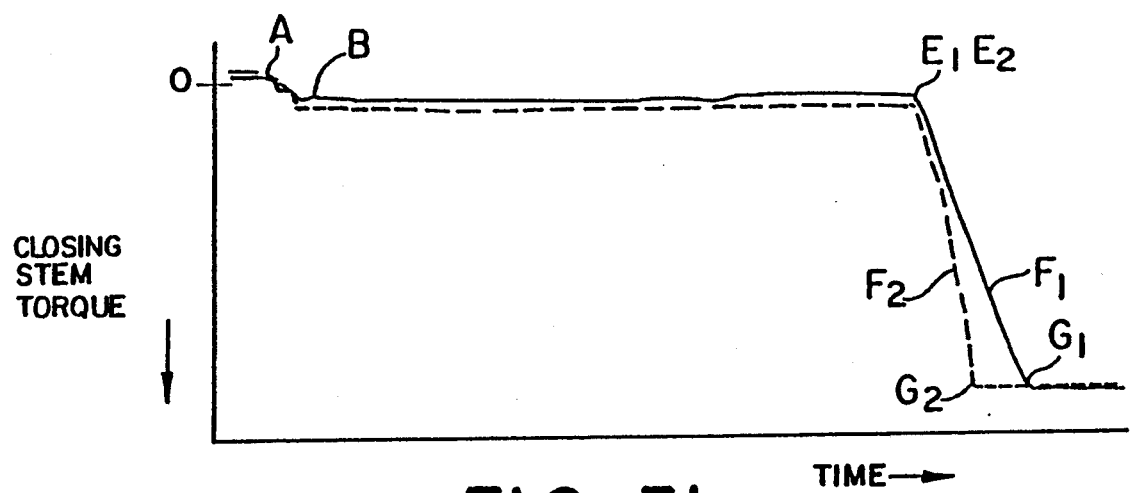
Figure 3C:
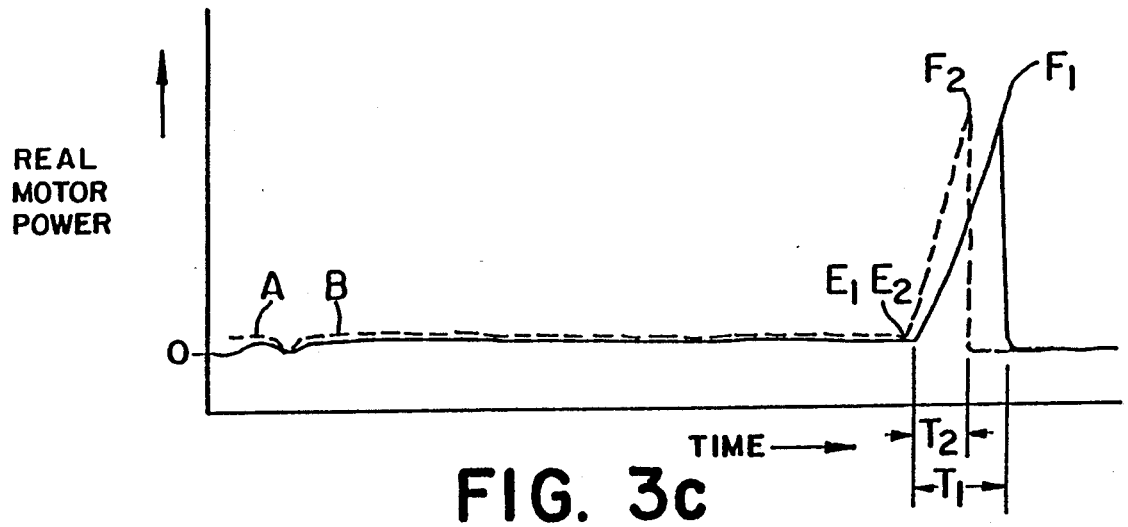

FIGS. 3b and 3c show the same two conditions for the same motor operated valve 10, except FIG. 3b shows the valve stem torque traces as a function of time and FIG. 3c shows the real motor power traces as a function of time. As in FIG. 3a, the solid trace (subscripts 1) is for the proper lubrication condition, and the dotted trace (subscripts 2) is for the lubrication degradation condition.

From FIG. 3a, the nearly halving of the stem thrust at torque switch trip (point $F_2$) due to lubrication degradation is obvious, as one might expect it would be from a stem thrust measurement. By contrast, from FIGS. 3b and 3c, the stem torque and motor power are nearly unchanged (point $F_1$ to $F_2$) at torque switch trip between the properly lubricated and lubrication degradation conditions. Tests show that stem torque and motor power at torque switch trip actually tend to change just a little bit for a very significant degradation in lubrication. As a result of the near insensitivity of stem torque and motor power at torque switch trip to lubrication degradation, one may infer that only the thrust trace, obtainable only at-the-valve, is of use in detecting and measuring the dropoff in thrust due to lubrication degradation.

But a closer look at FIG. 3a shows that, for reasons which will hereinafter become apparent, despite the very significant lubrication degradation, the time rate of thrust build-up after the onset of wedging (point E) is virtually unchanged making it possible, after only one at-the-valve test, to remotely measure thrust reductions due to lubrication degradation without having to go back to the valve. The recognition that this can be done and the methodology for accomplishing it are key components of the present invention.

With the stem 24 and stem nut properly lubricated, an at-the-valve initial or first test is run, where a trace of valve stem thrust as a function of time is determined (FIG. 3a). The test is typically run under zero differential pressure conditions (i.e., no fluid flowing through the valve 12). This is preferable, but not absolutely necessarily.

After the expiration of some period of time, some lubrication degradation may have occurred, causing a decrease or dropoff in the stem thrust at torque switch trip, and an increase in the stem factor. A second test is now run, and only the real motor power trace as a function of time (FIG. 3c) is determined, remotely, for example, at the motor control center.

The parent patent application points out that the time (msec) from the onset of wedging to torque switch trip could be measured from a motor power trace obtained remotely at the motor control center (MCC), and multiplied by the previously measured but unchanging thrust rate (lbs/msec) after the onset of wedging to remotely approximate the thrust margin (lbs). Additionally, the measured time when compared to the previous time from the onset of wedging to torque switch trip could be used to quantify the degree of lubrication degradation. As the parent application also points out, if an initial motor power trace had been obtained, the ratios of the power rates (watts/msec) could also be used to estimate the degree of lubrication degradation, and this estimation would be more accurate since fewer assumptions were involved.

The present invention comprises a method to approximate remotely from the MCC, thrust differences before or after the onset of wedging, and absolute thrusts before or after the onset of wedging such as running thrusts, and the thrust at flow cutoff. The running thrust in a zero line pressure test is simply the packing force, and in a differential pressure test with line pressure is the packing force combined with the stem rejection force. It is important to be able to remotely monitor the running thrust value because if it gets too low it could result in undesirable valve leaks, and if it gets too high it could reduce the available thrust margin. It is even more important to be able to remotely approximate the thrust at flow cutoff so the valve factor can be effectively determined and any changes evaluated. The thrust at flow cutoff is typically less than the thrust at the onset of wedging, so the previous methodology is ineffective even in estimating the thrust difference between flow cutoff and torque switch trip. Thus there is clearly a need for the present invention. The following presents the technical facts and logical reasoning behind the methodology.

Plotting corresponding time points from FIGS. 3a and 3c on a graph (not shown) of thrust (lbs) vs total real motor power (watts) demonstrates that for a given lubrication condition, points before the onset of wedging and points after the onset of wedging lie essentially along the same straight line. For the degraded lubrication condition, the slope (lbs/watt) of that line is shallower indicating that the same change in thrust requires a larger change in power. When the slope of that line is known, it should be possible to approximate a thrust change anywhere (including a thrust change from zero for an absolute thrust approximation) simply by measuring the corresponding power change. But the slope of the line changes with the lubrication condition, and since the slope involves both a thrust change and a power change, it would seem that lubrication degradation cannot be taken into account remotely, that is from the motor power trace alone. Fortunately, however, this is not the case since the slope of the line (lbs/watt) applies to points both before and after the onset of wedging, and thus it can be determined on either side of the onset of wedging. Dividing the thrust rate (lbs/msec) after the onset of wedging by the power rate (watts/msec) after the onset of wedging solves the problem because after the onset of wedging the thrust rate is constant independent of lubrication condition, and only the power rate is affected by lubrication degradation. Thus, dividing the old thrust rate (time one) by the new power rate (time two), both after the onset of wedging, is equivalent to having divided the new thrust rate by the new power rate, and the result is valid below as well as above the onset of wedging.

The reason why the stem thrust builds up at a constant rate after the onset of wedging regardless of stem to stem nut lubrication degradation is believed to be due to the fact that once the stem 24, disc 18, and seat 20 are in a mechanical stackup, (as is the case at the onset of wedging), and if the motor speed is not seriously reduced, (and this is true for motor operated valve induction motors), and if the spring pack 32 displacement is much smaller than the corresponding circumferential displacement of the worm gear 31, (and this is typically true), then the rate of thrust build-up is primarily determined by the combined compliances of the total mechanical structure, and this is invariant.

Thus, though the present invention requires an initial thrust trace (time one), and it does not require a subsequent thrust trace (time two), nor does it require an initial motor power trace (time one), only the subsequent motor power trace (time two). The following equation is used for approximating remote thrust differences (absolute thrust when Y is set where the thrust is zero):

$$\{(THR)_x - (THR)_y\}_2 = \left( \frac{\left[\frac{d}{dt}(THR)_w + \right]_1}{\left[\frac{d}{dt}(POW)_w + \right]_2} \right) \{(POW)_x - (POW)_y\}_2$$

The subscript 1 refers to the initial thrust test. The subscript 2 refers to the subsequent (remote) motor power test. The subscript W+ refers to the region above the onset of wedging. The subscripts X and Y refer to points anywhere on the power trace where the motor is turning to apply thrust. For absolute thrust approximations corresponding to the thrust at point X, point Y should be set where the thrust is equal to zero.

The numerator of the quotient is the thrust rate as determined in the initial at-the-valve test. Specifically it is determined from a thrust trace such as FIG. 3a, after the onset of wedging (point E) where the thrust rate, or slope, or time rate of change (lbs/msec) is noted and recorded. The denominator of the quotient is the power rate as determined in the subsequent remote test. Specifically it is determined from a real motor power trace such as FIG. 3c, after the onset of wedging (point E) where the power rate, or slope, or time rate of change (watts/msec) is noted and recorded. Notice that the power rate, or slope, is greater for the case with significant stem 24 to stem nut lubrication degradation (subscript 2), which is assumed to be the lubrication condition at the time of the subsequent test. Forming the above quotient yields the thrust change to power change ratio (lbs/watt). It has the same value as what would have been determined had the thrust rate been actually determined at the time of the subsequent test, since the thrust rate after the onset of wedging is invariant as shown by the dotted and solid lines in FIG. 3a beyond point E. It is the power rate, now increased from the initial condition (subscript 1), that accounts for the lubrication degradation in the subsequent condition (subscript 2). The result is a correspondingly reduced value for the thrust change to power change quotient, which because it is valid both before and after the onset of wedging, means that correspondingly less thrust change occurs for a given power change anywhere on the trace where the motor operation results in the application of stem thrust.

The above thrust change to power change quotient does not apply to those few locations on the trace where the motor operation results in the reduction of stem thrust. This is because a different stem factor (or torque to thrust ratio) exists when the stem nut is turning to reduce thrust than when it is turning to apply thrust, and the quotient is being determined here with the stem nut applying thrust.

The power rate should be taken from the same power trace used to determine the power values (watts) at points X and Y. For the approximation of an absolute thrust value at X, the Y point should be set at a location where the stem thrust is known to be zero. The power at Y will not be zero because it takes power to drive the motor 26 and turn the gearing 28 in the actuator even though no thrust is being applied to the valve stem 24. The power difference (watts) between X and Y is then multiplied by the quotient (lbs/watt) to yield the thrust difference (lbs) between X and Y.

In some applications, it is possible to run a test with differential pressure across the valve, if not the full differential pressure, then some partial differential pressure. It is very desirable to conduct such a test because it more closely approximates actual valve operating conditions, and assumptions such as the ones regarding the disc friction or valve factor are either no longer assumptions or at least no longer big assumptions. Under a differential pressure condition, the differential pressure force previously described causes the stem thrust to slowly increase prior to the onset of wedging. This can lead to a condition known as rate of loading, or load sensitive behavior. When the thrust builds up slowly this way prior to the onset of wedging, the thrust at torque switch trip for a fixed torque switch setting can be significantly reduced when compared to the thrust at torque switch trip in the absence of differential pressure. Clearly this is a complicating factor because a zero differential pressure test generally does not uncover this type of problem if it exists.

Figure 4A:
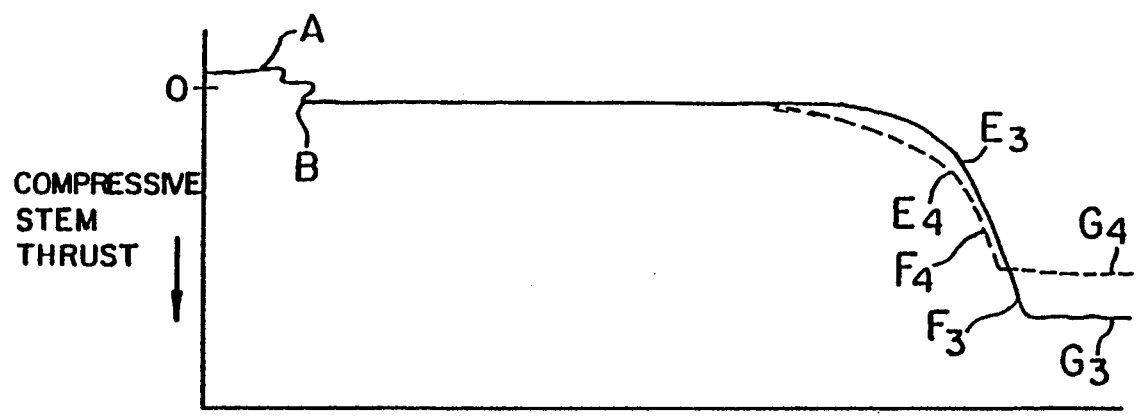
FIGS. 4a, 4b and 4c are composite graphic illustrations showing variations vs time in stem thrust, stem torque, and real motor power, respectively, during valve closure under differential pressure conditions, each showing the case of normal stem lubrication, and the case of significantly degraded stem lubrication, accentuating for comparison purposes the differential pressure force region before the onset of wedging and the seating region after the onset of wedging.

FIG. 4a shows typical stem thrust traces as a function of time for the closing of a motor operated gate valve 10 under non zero differential pressure conditions. The solid trace (subscripts 1) of FIG. 4a is for the motor operated valve 10 with proper stem to stem nut lubrication. The dotted trace (subscripts 2) is for the same motor operated valve 10, but at a second or subsequent time after significant seem to stem nut lubrication degradation has occurred. Referring to FIG. 4a, when the valve 12 first starts to close, the initial stem tension (point A) which is packing force that has been reduced by the stem rejection force from the line pressure trying to eject the stem 24, now goes through a zero force plateau which begins as the stem nut disengages the lower thread surfaces of the valve stem 24 and ends as it reengages the upper thread surfaces of the valve stem 24 and starts to push the stem 24 toward the seat 20, in so doing picking up the packing force plus the stem rejection force (point B). The trace illustrated in FIG. 4a is for the most common condition where the magnitude of the packing force exceeds that of the stem rejection force. For the differential pressure case, unlike the zero differential pressure case (FIG. 3a), the thrust begins to gradually build up long before the onset of wedging (point E). This is due to the differential pressure forcing the disc 18 against the downstream seat 20a as it begins to close off the opening, the increasing stem force being the result of the increasing normal force increasing the friction between the disc 18 and seat 20 surfaces. After wedging (point E), the thrust rate closely matches the rate measured in the zero differential pressure case (FIG. 3a).

The lubrication degradation condition, shown dotted, mirrors the proper lubrication condition until the torque switch trip point (point F). With lubrication degradation, less thrust results for a given amount of torque and power, and thus the torque switch, which is reacting to torque, trips at a lower thrust level (subscript 2) than before (subscript 1). A condition called rate of loading, or load sensitive behavior may affect certain motor operated valves under differential pressure conditions. When this condition occurs, it acts just like lubrication degradation, also causing lower thrust for the given amount of torque and lower thrust for the given torque switch set point. Thus the method of the present invention which is effective for lubrication degradation, needs no added justification for the condition of rate of loading or load sensitive behavior.

Figure 4B:
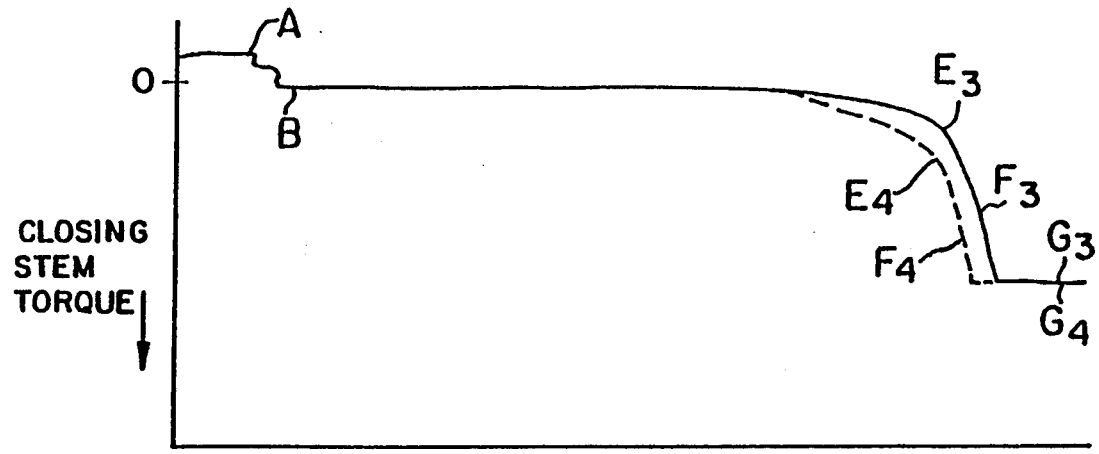
Figure 4C:
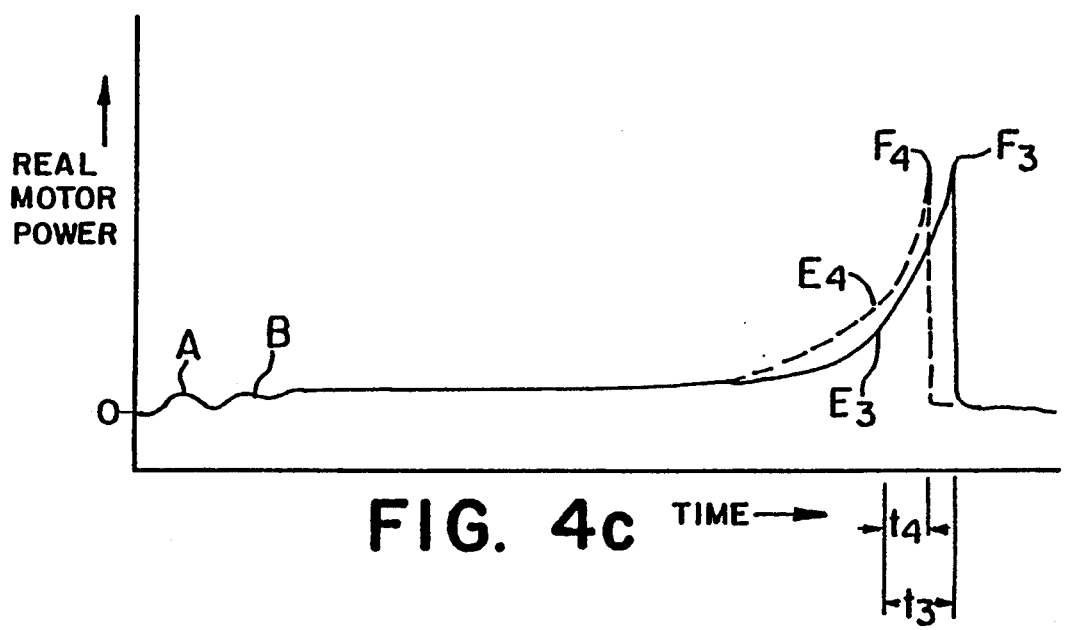

FIGS. 4b and 4c show the same two conditions for the same motor operated valve 10, except FIG. 4b shows the valve stem torque traces as a function of time and FIG. 4c shows the motor power traces as a function of time. As in FIG. 4a, the solid trace (subscripts 1) is for the motor operated valve 10 with proper stem to stem nut lubrication. The dotted trace (subscripts 2) is for the same motor operated valve 10, but at a subsequent time after significant stem to stem nut lubrication degradation has occurred. Notice the easily recognizable zero force plateau in the motor power trace (FIG. 4c) between points A and B. Also notice how the two lubrication conditions, almost colinear in the thrust traces of FIG. 4a, clearly separate in the power traces of FIG. 4c, reflecting that difference in lubrication condition. Finally notice how in FIG. 4c, the slope of the solid line (watts/msec) after the onset of wedging (point E1) is essentially the same as it is in FIG. 3c, reflecting the same lubrication condition. Similarly, the dotted lines in FIGS. 4c and 3c have the same higher slope (watts/msec) after the onset of wedging (points E2) reflecting the same degraded lubrication condition. Thus the change in lubrication condition is properly taken into account by the power slope after the onset of wedging, whether the subsequent test is a differential pressure test or a non differential pressure test. If there is a rate of loading condition as well in the differential pressure test, this is automatically taken into account since it appears as additional lubrication degradation, further increasing the power slope (watts/msec) after the onset of wedging.

It remains only to select the points or locations X and Y from the real motor power trace in order to compute by the above equation from the measured power difference (watts) the thrust difference (lbs) between the two selected locations. Notice from FIGS. 3c and 4c the obviousness of the zero thrust plateau in the motor power trace. The approximation of absolute thrust at X requires only the measurement of the power difference between X and Y, where Y is measured at the zero thrust plateau.

From the foregoing description, it can be seen that the method of the present invention is essentially the combination of four powerful insights; (1) the recognition that in a motor operated valve the thrust rate (lbs/msec) is effectively constant after the onset of wedging independent of both lubrication degradation and rate of loading effects; (2) the recognition that the ratio of thrust to real motor power (lbs/watt) is effectively constant for a given lubrication condition before as well as after the onset of wedging; (3) the recognition that the current (lbs/watt) value valid for before and after the onset of wedging can be determined remotely by ratioing a previously determined (lbs/msec) value after the onset of wedging with a current (watts/msec) value after the onset of wedging determined remotely from the motor power trace; and (4) that the motor power trace contains identifiable features including a recognizable zero thrust region that allows power differences (watts) including differences from zero thrust to be read off the motor power trace, these then combined with the (lbs/watt) value obtained above to yield a totally remote approximation of thrust differences or absolute thrust (lbs) anywhere the motor is turning to apply thrust.

It will be appreciated by those skilled in the art that changes could be made to the above described embodiment without departing from the broad inventive concepts thereof. It is understood, therefore, that this invention is intended to cover all modifications which are within the scope and spirit of the invention as defined by the appended claims.

I claim:

1. A method for approximating a stem thrust difference during the operation of a motor operated valve combination including a valve having a valve stem, a valve disc, a valve seat, and a motor operator having a motor drive means interconnecting the motor to the valve stem for movement of the valve disc toward and into engagement with the valve seat to close the valve and a control switch for deactivating the motor, the method comprising the steps of:

(a) sensing the stem thrust of the motor operated valve combination as a function of time during valve closing at a first time;
 (b) determining from the sensed information the time rate of thrust build-up after the onset of valve wedging during valve closing at the first time;
 (c) sensing the real electrical power of the motor as a function of time during valve closing at a second time which is subsequent to the first time;
 (d) determining from the sensed information the time rate of motor power build-up after the onset of valve wedging during valve closing at the second time;
 (e) approximating the ratio of thrust change to power change, before and after the onset of valve wedging at the second time, by dividing the rate of thrust build-up after the onset of valve wedging at the first time by the rate of power build-up after the onset of wedging at the second time;
 (f) selecting two locations on a trace of real motor power as a function of time at the second time for which it is desired to approximate the corresponding thrust difference at the second time, and determining the power difference between the two selected locations; and
 (g) approximating the thrust difference between the two selected locations on the trace of real motor power as a function of time at the second time by multiplying the power difference between the two selected locations by the approximated ratio of thrust change to power change.

2. The method as recited in claim 1, wherein one of the two selected locations on the trace of real motor power as a function of time at the second time corresponds to a zero thrust condition so that the approximation of the thrust difference becomes an approximation of absolute thrust at the other selected location on the trace of real motor power as a function of time at the second time.

* * * * *